United States Patent [19]
Church et al.

[11] Patent Number: 5,597,340
[45] Date of Patent: Jan. 28, 1997

[54] ULTIMATE INDUCTIVE HEAD INTEGRATED LAPPING SYSTEM

[75] Inventors: Mark A. Church, San Jose; Alain M. Desouches, Santa Cruz; Richard E. Krebs, San Jose, all of Calif.

[73] Assignee: International Business Machines Corporation, Armonk, N.Y.

[21] Appl. No.: 300,820

[22] Filed: Sep. 2, 1994

Related U.S. Application Data

[62] Division of Ser. No. 936,823, Aug. 28, 1992, Pat. No. 5,361,547.

[51] Int. Cl.⁶ .............................. B24B 49/02; B24B 49/10
[52] U.S. Cl. ................ 451/5; 451/11; 29/603.16
[58] Field of Search ...................... 451/1, 5, 11; 29/603

[56] References Cited

U.S. PATENT DOCUMENTS

| | | | |
|---|---|---|---|
| 3,821,815 | 6/1974 | Abbott et al. | 360/110 |
| 4,014,141 | 3/1977 | Riddle et al. | 51/165 |
| 4,219,853 | 8/1980 | Albert et al. | 360/103 |
| 4,295,173 | 10/1981 | Romankiw et al. | 360/125 |
| 4,511,942 | 4/1985 | Valstyn | 360/126 |
| 4,689,877 | 9/1987 | Church | 451/1 |
| 4,841,625 | 6/1989 | Valstyn | 29/603 |
| 4,861,398 | 8/1989 | Fukuoka et al. | 156/64 |
| 4,912,883 | 4/1990 | Chang et al. | 451/1 |
| 4,914,868 | 4/1990 | Church et al. | 451/5 |
| 4,991,046 | 2/1991 | Adamson et al. | 360/122 |
| 5,175,938 | 1/1993 | Smith | 451/1 |
| 5,214,589 | 5/1993 | Tang | 451/1 |

FOREIGN PATENT DOCUMENTS

| | | | |
|---|---|---|---|
| 4053672 | 2/1992 | Japan | 451/1 |

OTHER PUBLICATIONS

Kawakami et al, J. Appl. Phys., vol. 61, No. 8, pp. 4163–4166 (Apr. 1987).
IEEE Transacations on Magnetics, vol. Mag–17, No. 6, Nov. 1981, Substrate Testing of Film Heads by N. C. Anderson and R. E. Jones, Jr.

*Primary Examiner*—Robert A. Rose
*Attorney, Agent, or Firm*—Baker, Maxham, Jester & Meador

[57] ABSTRACT

A lapping control system for accurately obtaining a desired throat height of each of a plurality of batch fabricated thin film magnetic transducers, comprises a row of thin film transducers formed on a substrate, the row comprising a height defining edge and at least four spaced sensing devices, a first two of the sensing devices comprising switch devices each offset a predetermined amount from the height defining edge, and a second two of the sensing devices comprising resistive devices each offset a predetermined amount from the height defining edge, a support of mounting the row of thin film magnetic transducers in a position to lap the height defining edge of each of the thin film magnetic transducers and the sensing devices, a measuring device for measuring the resistance of the resistive devices during lapping of the height defining edge, apparatus responsive to the measured resistance and to a selected state of at least one of the two switch devices for calibrating resistance versus throat height characteristics for each of the thin film magnetic transducers in the row, and for terminating the lapping process when a predetermined throat height is reached for each of the thin film magnetic transducers.

13 Claims, 6 Drawing Sheets

ULTIMATE INDUCTIVE HEAD INTEGRATED LAPPING SYSTEM

This application is a divisional of application Ser. No. 07/936,823, filed Aug. 28, 1992 now U.S. Pat. No. 5,361,547.

BACKGROUND OF THE INVENTION

1. Field of the Invention

This invention relates to a method and apparatus for controlling the manufacture of inductive thin film magnetic recording heads and pertains particularly to an improved lapping control system for obtaining improved inductive heads.

2. Description of the Prior Art

In high speed data processing systems, magnetic disks have been employed for large memory capacity requirements. Data is read from and written onto disks through magnetic transducers commonly called "magnetic heads" which are positioned over the disks during the storage and retrieval of data on tracks of the disks. The requirements for higher data density on the magnetic disks have imposed a requirement to read and write more data on narrower tracks located on the disk. In order to achieve maximum efficiency from a head, its pole pieces must have a pole tip height dimension, commonly called "throat height", which must be maintained within a certain limited tolerance for generating a maximum amount of electrical signals for a given head.

The conventional method for producing a required throat height includes a lapping system in which an abrasive grinding surface accurately grinds the pole tips to a desired length. Suitable techniques for controlling the throat height during the lapping operation are described in commonly assigned U.S. Pat. No. 4,689,877. In this patent, a technique is employed for measuring the resistance of electrical lapping guide (ELG) structures formed on each side of a row of transducers being lapped to a final throat height. These structures are lapped along one dimension to the same extent as the transducer pole tips. The resistance of an ELG structure at any given time indicates the amount of material that has been removed and hence the resistance is an indication of the final throat height of the transducers being lapped.

Another improved system is described in U.S. Pat. No. 4,914,868 which discloses a lapping system which is particularly designed for lapping magnetoresistive (MR) transducers. The system measures the changing resistance of an MR element as the MR element is lapped as a means to determine when the desired MR element height is reached.

Various techniques for calibrating ELG structures to provide for tracking to the throat height have been published. However, the basic problem that the structures do not match the structure of the magnetic head, remains. For this reason, these techniques may not work to the precision required.

There have been suggestions that the magnetic head characteristics can be evaluated from a signal which is generated by the head itself. In the publication "Substrate Testing of Film Heads" by Jones et al, IEEE Trans. Magn., Vol. 17, No. 6, p. 2896–8 (1981), a description is given of a test by which a measured inductance versus d.c. current through the head can be used to characterize saturation of the heads pole tips. Published Unexamined Japanese patent Application No. 62-287408 utilizes a high frequency signal in addition to a d.c. bias current to periodically magnetically saturate a magnetic head and then senses the reduction of head impedance due to the saturation to determine the write characteristic of the head. The Kawakami et al publication, J. Appl. Phys., Vol. 61, No. 6, p. 4163–6 (1987) describes the use of a special magnetic head, in which the pole tips are closed, to determine the end point in a lapping operation by sensing the change in inductance when the pole tips are opened.

Improvements and refinements in these approaches are disclosed in commonly assigned U.S. Pat. No. 4,912,883. In this patent, it is disclosed that the write current which first saturates a magnetic head (ISAT) can be related to the throat height and head magnetic performance parameters, provided that the saturation takes place in the front region of the head.

These prior art techniques are useful so long as throat height is the controlling parameter. However, as the magnetic heads have become progressively smaller, the throat height, pole tip thickness, and gap thickness have all decreased. This has contributed to the fact that throat height is no longer the only important influence on ISAT characteristics. Now, wafer to wafer variations can cause significant departures from a pre-established ISAT correlation.

Many methods for fabricating inductive thin film magnetic heads have led to numerous electronic lapping guide designs, calibration techniques and bow compensation systems. While many of these proposals have resulted in tighter control of throat heights, none have ultimately provided a system for satisfying extremely tight throat height requirements when operating in a small slider, high wafer density, low cost environment. In this environment, throat height must be controlled to less than ±0.5 microns.

In order to meet these stringent requirements, the most precise electronic lapping guide (ELG) design calibration system and active bow compensation must be employed. In order to keep cost down, the wafer densities must be as high as possible which necessitates a small slider format with as many sliders per row and rows per wafer as possible. This eliminates dedicated ELG sites since they would compete with valuable areas designated for sliders.

To meet these objectives, ELGs must be placed in row parting kerfs for maximum population of head rows and the parting kerfs must be as narrow as parting methods will permit to further maximize head densities per row. Current requirements provide for slider widths of 1.7 mm with a height of 0.425 mm leaving a total parting kerf of 0.30 mm. After parting tolerances are considered, an area of only 0.20 mm×0.425 mm can be allocated for ELG designs. It should be noted that even smaller sliders with even smaller kerfs are in demand.

None of the prior art systems are capable of meeting these requirements. Moreover, none of the prior art systems can be adapted to this application without major alterations. For example, conventional ELG designs with conventional resistive calibration systems of the prior art will not fit in a 0.2 mm kerf.

Calibrated ISAT approaches also fail to meet the objectives outlined above. The ISAT systems do not have the effective response range to provide a means for active bow compensation feedback, where response kerfs must be active from around 10 microns from final throat height. The ISAT responses typically began at 2.5 microns from final throat height. The short response curve does not provide enough working distance to adequately straighten the bow before the final throat height target is reached, resulting in wider throat height range and lower yield. In addition, calibrated ISAT, like calibrated resistive lapping has an ELG size limitation. The best implementation of calibrated ISAT regarding throat height controls requires offset element and switching components that far exceed the 0.2 mm kerf area allotted for ELGs.

Therefore, there is a need for an improved inductive head lapping system.

SUMMARY OF THE INVENTION

It is the primary object of the present invention to provide an improved lapping control system for accurately obtaining a desired throat height for batch fabricated thin film inductive magnetic transducers.

In accordance with a primary aspect of the present invention, a lapping control system for obtaining desired throat height of each of a plurality of batch fabricated thin film magnetic transducers includes a row of thin film magnetic transducers formed on a substrate with a height defining edge and at least four spaced test devices with a first two of said devices comprising switch devices each offset a predetermined amount from said height defining edge and a second two of said test devices comprising resistive devices each offset a predetermined amount from said height defining edge, means for measuring the resistance of said resistive devices during lapping of said height defining edge, means responsive to said measured resistance and to a selected state of at least one of said two switch devices for calibrating resistance versus throat height characteristics for each of said thin film magnetic transducers, and means for terminating said lapping process when a predetermined throat height is reached for each of said thin film magnetic transducers.

BRIEF DESCRIPTION OF THE DRAWINGS

The above identified objects and advantages of the present invention, as well as the manner in carrying out the invention will be more fully understood from the following description of the illustrated embodiments when read in conjunction with the accompanying drawings, wherein.

DETAILED DESCRIPTION OF THE PREFERRED EMBODIMENTS

The present invention is preferably for use in the fabrication of thin film inductive head assemblies. The transducer portion of a thin film head is formed by depositing layers of magnetic material, electrically conductive material and electrically insulating material to form the well known pole pieces and magnetic gap necessary for the transducing function with a magnetic coating formed on a magnetic disk. A plurality of transducers are deposited onto a wafer which is then cut to form rows of the transducers with the transducers set in a side-by-side relationship with a separation kerf between adjacent heads. Each of the transducers comprises an inductive head. Electrical lapping guides (ELGs) are formed onto the wafer at the same time that the transducers are deposited. In order to achieve economy and a high degree of accuracy in the lapping, the lapping guide structures are formed and confined in the kerfs between adjacent sliders and at the ends of the row.

At least one electrical lapping guide (ELG) device is deposited in each of the kerf areas between the sliders and at each end of the row of transducers. The ELG devices are used to control rough lapping of a row of transducers and are sensed to control lapping to the final throat height of the transducers. The wafer is formed to become the slider of the magnetic head. The finished slider is mounted onto an accessing system for locating the magnetic head onto tracks formed by the magnetic heads when writing onto the rotating disk. A lapping control system according to the present invention, therefore, controls the lapping of a row of transducers in the batch fabrication process. The present invention is particularly developed for the economical fabrication of small sliders arranged in a high density row.

Figure 1:
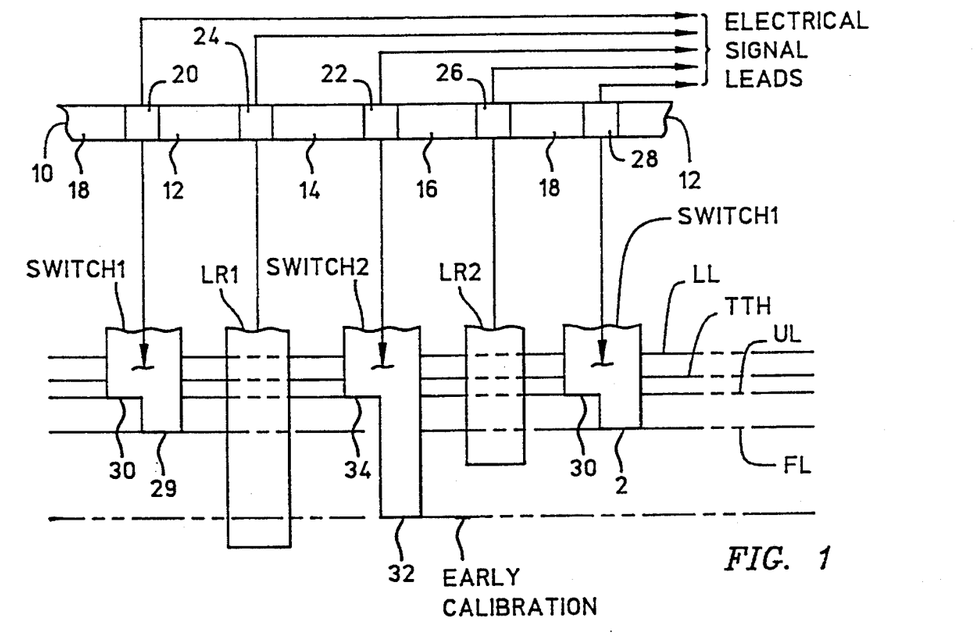
FIG. 1 is a diagram illustrating a top plan section of a substrate row in accordance with the present invention.

Referring to FIG. 1, there is illustrated a block diagram of an embodiment of an apparatus that senses and guides the lapping of a substrate row including row section 10 having a plurality of product sliders. The row section 10 represents a high density row of inductive heads on closely spaced small sliders, and includes the small sliders 12, 14, 16 and 18 separated by four alternating kerfs 20, 22, 24 and 26 which also provide or incorporate four different ELG devices. A respective electrical signal lead is provided to each ELG device to conduct signals from the slider row during lapping. The typical row will comprise 23 sliders with 24 ELG devices at 24 positions surrounding the sliders. Thus, the row section 10 represents one of a sequence of six sections which form a complete row. In such a row, sliders are preferably about 1.7 mm wide by 0.425 mm high with a total parting kerf of 0.30 mm. Allowing for parting tolerances leaves a kerf area of 0.20 mm×0.425 mm for an ELG. Two different dual function ELG limit switching devices (hereinafter, "switches") are provided in the two kerfs 20 and 22 of the four alternating kerfs to indicate calibration and throat height limits. Two different ELG resistive leveling devices (hereinafter, "leveling resistors" or "LRs") are provided in the remaining two kerfs 24 and 26 of the four alternating kerfs to indicate progress of the lapping process. Thus each slider is disposed between a limit switching device and a leveling resistor device. One of the leveling resistor devices includes a bypass resistor to facilitate lead resistance calculations. The leveling resistor devices operate as a pair, having a differential offset height for calculation of device characteristic constants.

Because of space limitations, a maximum slider density is achieved by the use of kerf ELG devices where the ELG functions are separated to provide a means for ELG size reduction. The ELG devices are thus sized and fitted to the kerf area. This enables four separate ELG devices to be provided in the alternating kerfs and lapping constants to be calculated from the individual ELG functions.

Figure 2:
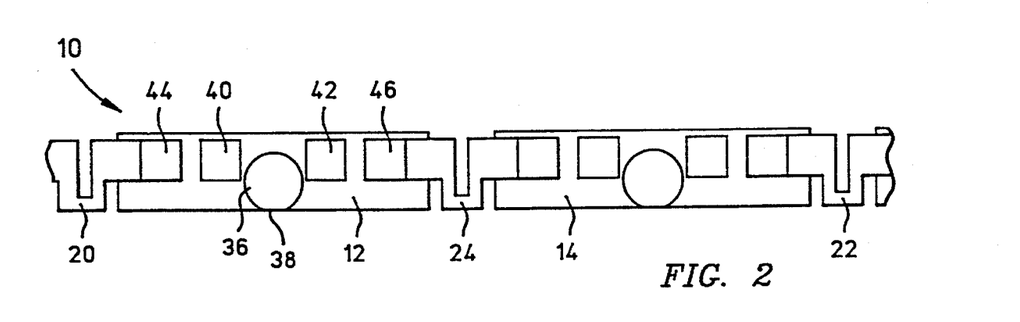
FIG. 2 represents a side view of one portion of the substrate row section in FIG. 1, illustrating the lapping guide arrangement according to an embodiment of the present invention.
Figure 3:
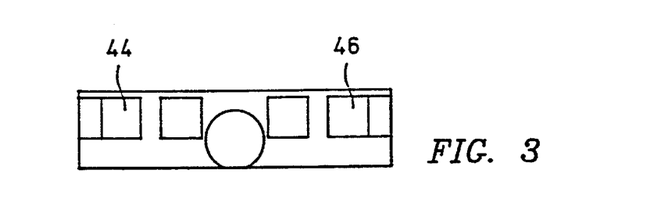
FIG. 3 is a view like FIG. 2 illustrating a slider element from the substrate row section of FIG. 2.

Referring to FIG. 2, a magnified side view illustrating sliders and parting kerfs shown in FIG. 1 is presented. Each substrate is formed into a plurality of sliders with kerfs such as the kerfs 20, 22, 24 and 26 separating the substrate into the sliders, each slider with a thin film magnetic transducer 36 and having a height defining edge 38 which is an edge of the surface to be lapped. Bonding pads 40 and 42 are provided for the transducer 36, and pads 44 and 46 are provided for probe connection of the adjacent ELG to testing and utility circuits. Once the slider has reached its optimum level during the lapping process, a switching device is activated to reduce or stop the lapping. Providing all of the sliders are appropriately lapped to the optimum position, the lapping operation is then terminated. Thereafter, the sliders are separated along the kerfs to form individual sliders as illustrated in FIG. 3. After row parting, the leads 44 and 46 to the kerf ELG connectors become electrostatic discharge rods.

Referring again to FIG. 1, the slider row including the row section 10 is mounted to a holder which is acted on by a plurality of actuators which act as described below to position the substrate row against a lapping plate (not shown). The actuators urge the substrate row against the lapping plate and control the amount of pressure placed against the holder. The lapping plate is an abrasive surface which moves relative to the substrate surface including the edge 38 and effects a lapping of the substrate row containing row section 10. The row is lapped in order to remove material so that the throats of the transducers 36 can be precisely located as will be described.

The depth and flatness of the lapping in the row containing row section 10 are monitored through the ELG devices in kerfs 20, 22, 24 and 26. These ELG devices are deposited on the substrate at the same time as the various of the layers of the transducer elements 36 and provide means for electrically determining the throat height for the transducer elements.

The ELG devices in the kerfs 20 and 22 are dual function limit switching devices denoted, in FIG. 1, as "switch 1" and "switch 2", respectively. Each limit switching device is a two-position switch, and each exhibits a structure and operation similar to the multiple position switches illustrated and described, for example, in U.S. Pat. No. 4,689,877, at FIG. 5. The switches of this invention, however, provide only two resistance switching positions, rather than the four positions of the '877 patent. The separation of a larger limit switching structure into a distributed pair of smaller structures enables the smaller structures to be located in the kerfs, but retains the capacity to sense all of the limits necessary to control the lapping process.

The lower portion of FIG. 1 is a schematic representation of an enlarged side view of the ELG devices located, respectively, in kerfs 20, 22, 24, 26 and 28. The right-most kerf 28 is included to indicate that the pattern of the four kerfs repeats in the row from left to right. Accordingly, the limit switching device in the right-most kerf 28 is identical with the limit switching device in the left-most kerf 20. The side view of FIG. 1 shows two switching planes for each switch. Each switching plane is positioned at a predetermined elevation with respect to the zero throat height of the slider row including the row section 10. As the surface of the slider row is lapped, the switching planes are encountered. Switch 1 in kerf 20 provides a first height limit (FL) at a switching plane 29 and an upper throat height limit (UL) at a switching plane 30. Switch 2 in kerf 22 provides an early calibration height at a switching plane 32 and the upper throat height limit at a switching plane 34. Both switches function essentially identically with an initial low resistance which jumps to a fixed value when the first switching plane is reached and then to infinity when lapping occurs at the second plane. For reference, the target throat height (TTH) and a lower throat height limit (LL) are also shown in FIG. 1. Both of these limits are above a level termed the "zero throat height" where the pole pieces of the heads begin to diverge, but are below the last level where the switches change state.

The two leveling resistors (LR1 and LR2 in FIG. 1) are provided in the two remaining kerfs 24 and 26, respectively, of the four kerf positions in the row section. Leveling resistor LR2 is a bypass device including a bypass resistor. Both leveling resistors are designed with differential height offsets in order to operate them pair-wise, with a device characteristic constant (k) calculated after the bypass resistor is removed as more fully set forth below.

Figure 4:
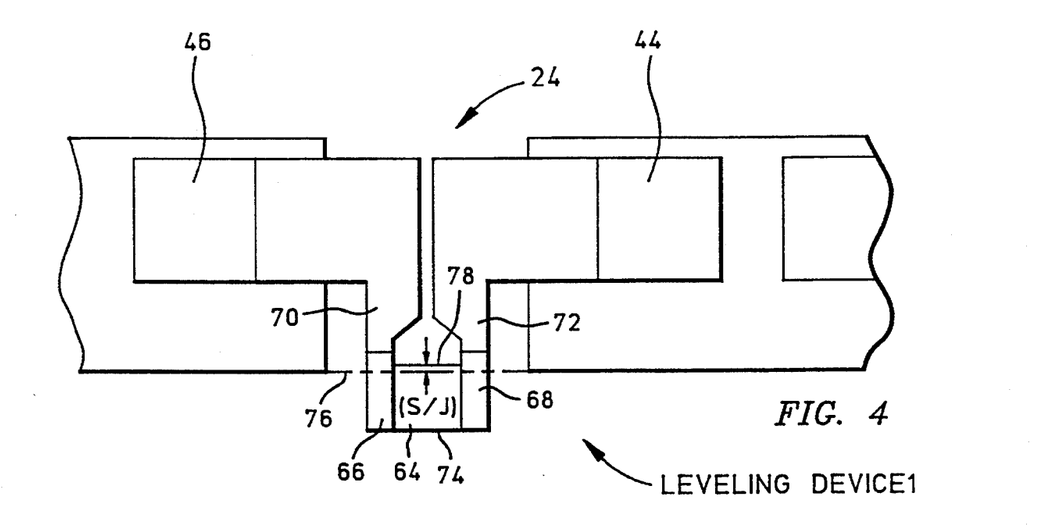
FIG. 4 is an enlarged portion showing construction details of a first leveling resistor in accordance to an embodiment of the present invention.

The leveling resistors LR1 and LR2 provide for measuring a varying resistance as lapping progresses. Referring to FIG. 4, for example, leveling resistor LR1 in kerf 24 comprises a chrome (Cr) long stripe resistor 64 connected through nickel ion (NiFe) leads 66 and 68 to nickel iron copper (NiFe/Cu) leads 70 and 72. The leads 70 and 72 are connected to lead pad 46 on slider 12 and lead pad 44 on slider 14, respectively. These components may be constructed of other materials, but the specified materials are preferred. The resistor 64 has an upper edge 74 disposed above the zero throat height reference 76 and an lower edge 78 disposed below the zero throat height reference. The resistance (R) of this leveling resistor varies in accordance with $R=(p/t)\times(l/w)$, where R=Resistance of the lapping guide resistor 64, p=resistivity of the material comprising the resistor 64, l=the resistor 64 length, w=the resistor 64 width, t=the thickness of the resistor 64.

Lapping of the surface 74 of the resistor will reduce the width w of the resistor 64, increasing the resistance R of the resistor along a hyperbolic curve as it gets lapped away. Measuring this resistor thus makes it possible to monitor the positional change of a lapping surface (not shown) as it approaches the zero throat height 76.

Figure 5:
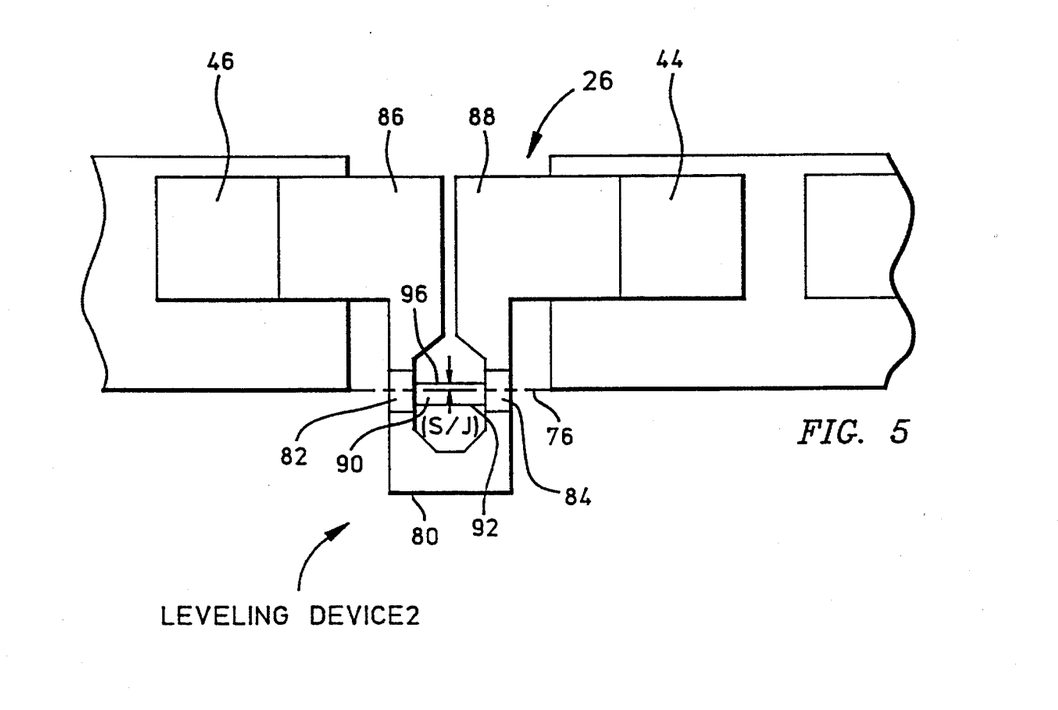
FIG. 5 is a view like FIG. 4 of a second leveling resistor.

Referring now to FIG. 5, leveling resistor LR2 in kerf 26 includes a short stripe leveling resistor 90 in combination with a bypass resistor 80 of very low resistance preferably formed with copper 1 plus copper 2 plus nickel iron (Cu1+Cu2+NiFe). The bypass resistor 80 is connected between nickel iron (NiFe) leads 82 and 84, which are connected through nickel chrome copper (NiCrCu) leads 86 and 88, to terminal paths 44 and 46 between sliders 16 and 18. The short stripe resistor 90 is a chrome device which also extends between the two leads, 82 and 84, parallel to the resistor 80. The stripe heights of the resistor 90 and the bypass resistor 80 need not be equal for certain applications. They may also be constructed of the same material for certain applications to provide an identical resistor.

In the preferred embodiment, the bypass resistor 80 is significantly lower in resistance than the resistor 90. In this regard, the resistance of the stripe resistor 90 is at least a factor of 40 over the resistance of the bypass resistor 80 so that the difference in resistance before and after the bypass resistor is lapped away will have enough resolving capability to estimate lead resistance. In this embodiment, before the bypass resistor is removed the resistance is given as: $R_b = [R_{mr} \times R_{by}/(R_{mr}+R_{by})]+RL_t$, where:

$R_b$=resistance before removing the bypass, $R_{mr}$=Resistance of the stripe 90, $R_{by}$=Resistance of the bypass stripe 80, and $RL_t$=Total lead resistance to the transducer.

After the bypass resistor is removed, the resistance of leveling resistor LR2 is then given as:

$R_a=R_{mr}+RL_t$, where $R_a$=resistance after removing the bypass.

When the bypass stripe 80 is removed, the resistance changes to that provided by the resistance stripe 90. The resistance stripe 90 has an edge 92 that is above the zero throat height 76 with an edge 96 below the zero throat height.

The leveling resistors are deposited by thin film deposition during the manufacture of each of the thin film transducers 36. The parameters of the resistors are controlled during manufacture so that the thickness and width of each resistor are predetermined. Resistivities are determined by the metallic layers used as the resistors. The length and width of each resistor are determined by the mask used. In both leveling resistors, the back edges of the resistive stripes extend below the zero throat height reference 76. The difference between the zero throat height and the back edge of the resistive stripe in each case is referred to as strap-to-junction distance (S/J).

Figure 6:
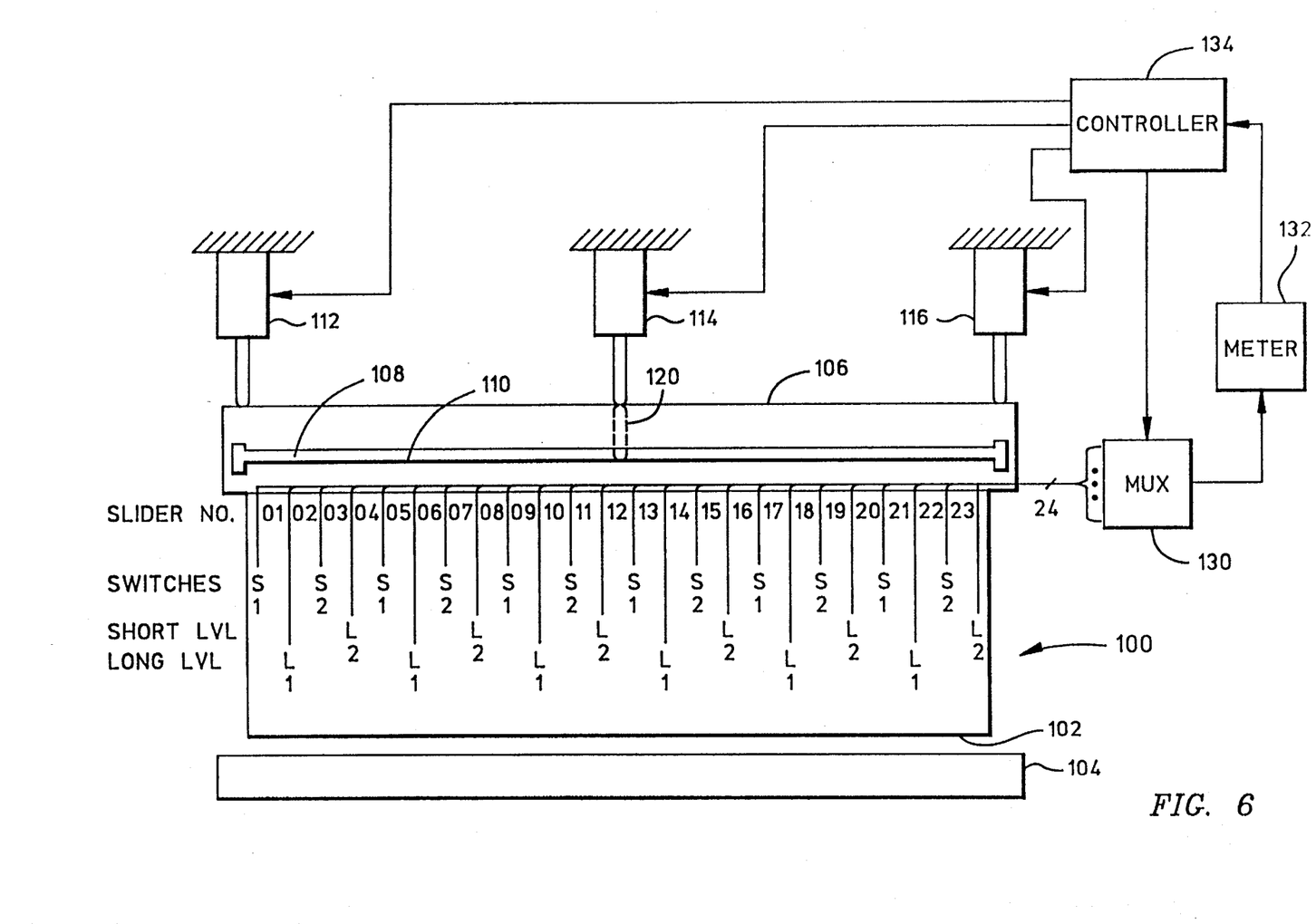
FIG. 6 is an overall block diagram illustrating a lapping system in accordance with the present invention.

FIG. 6 is a schematic block diagram which illustrates a lapping system according to the invention. The figure is not to scale and relative dimensions are exaggerated for illustration only. The system includes a schematic representation of a row 100 of 23 sliders with 24 kerfs. An ELG device has been deposited in each kerf and the array of ELG devices exhibits repetition of the basic pattern of four devices shown in FIG. 1. In FIG. 6, the sliders occupy row positions 01–23. In each kerf between a slider position there is an ELG device having one of the four forms described above. In addition, one of the four ELG forms is also placed at each end of the row. This supports calculation of and compensation for bow of the row during lapping at the same time that lapping depth is monitored.

In FIG. 6, the four forms are designated as switches S1 and S2 corresponding respectively to the identically-designated devices in FIG. 1, and L1 and L2, corresponding respectively to leveling resistors LR1 and LR2.

In the discussion which follows, switch operation is discussed in terms of "shunts" which refer to conducting areas that are lapped away and which terminate at the switching planes discussed above in reference to FIG. 1. Since the switches are both dual-function switches, each has two shunts. Both switches function in the same way: initially the switch resistance is low, then jumps to a fixed value when the first shunt gets lapped away, then jumps to infinity when the second shunt is lapped away. Relatedly, the first shunt of S1 is lapped away at the first height limit, while the second shunt is lapped away at the upper throat limit. In switch S2, the first shunt is lapped away at an early calibration point, while the second shunt is lapped away at the upper throat limit.

Leveling resistor L1 in FIG. 6 is referred to as a "long leveler" because of its relatively long resistive stripe. Leveling resistor L2 is referred to as a "short leveler" because of its relatively short stripe resistor. The slider row 100 includes an edge 102 which is included in a lapping (not shown) of the slider row which is to be lapped by a lapping plate 104. The slider row 100 is brought against the lapping plate 104 by a holder 106 having an elongated "H"-shaped slot 108 defining a deflecting beam member 110 to which the slider row 100 is conventionally attached. The holder 106 is placed against three actuators 112, 114 and 116 which position the substrate 100 into a spaced relationship with the lapping plate 104. The actuator 114 exerts a concentrated load at the center of the deflecting beam member 110 by way of a captured push rod 120.

As will be appreciated with reference to U.S. Pat. No. 4,914,868, which is incorporated herein by reference, the mounting of the row 100 on the bending beam 110 supports differential lapping of the slider row 100. By this technique, the provision of different pressures causes different amounts of material to be lapped. For example, when the central pressure exerted through the push rod 120 is lower than the end pressure exerted by the actuators 112 and 116, the throat height of transducers in the middle of the slider row 100 will be proportionately larger than the throat heights of the transducers at either end of the slider row.

Control of the pressure exerted on the slider row by the beam 110 is by way of a conventional electronic system including a multiplexor 130 connected by conventional signal leads to each of the ELG devices disposed in the kerfs of the slider row. Multiplexor 130 senses the electrical resistances of the leveling resistors and the stages of switching of the switches in the kerfs and sends the information to a meter 132, which can be a conventional ohmmeter. From the ohmmeter 132, the information is forwarded to a controller 134. The controller 134 controls the actuators 112, 114 and 116 such that the substrate row 100 is kept level by varying the pressure on the separate actuators. The most critical dimension for lapping of slider row 100 is the throat height of the transducers.

The above described system is integrated by an algorithm which draws together all of the parameters within the lapping system. In this system, the controller 134 is programmed to integrate all of these parameters and determine, with the alternate ELG structures, the required differential force to maintain the lapped surface level with respect to the final throat height for the transducer array. Additionally, an end resistance may be determined for each electrical guide resistor identifying a desired throat height. Lapping may be terminated at this desired throat height, and the prior art technique of fine lapping during a final cycle may be avoided. Alternatively, lapping may be terminated when the switches change states. Thus, the system provides a means of obtaining height production from a high density array of transducers at low cost.

The prior art techniques for control of the lapping process have increasingly focused on leveling resistor measurements during lapping to provide values for lapping control parameters. The principal values used are resistance of the leveling resistors and resistance transitions of the switches.

Leveling resistor resistance is, with precalibration, directly convertible to the stripe height (SH) of the resistor, and therefore, to lapping depth. Precalibration of these devices includes determination of the lead resistance ($R_L$) and a resistance parameter value (K). These values are used to correct the measured resistance values so that they more accurately reflect stripe heights. See the '877 and '868 patents in this regard. However, because of the excess length of the resistive stripes beyond the zero throat level, stripe height is an unreliable indicator of throat height measured between the lapped surface of a slider row and zero throat level. Accordingly, this excess length (strap-to-junction height, or S/J) must be accounted for in the calculation of stripe height from leveling resistor resistance.

The inventors have realized that the stripe heights of the switch shunt resistances provide a very precise measurement to the zero throat level because the switches are aligned in the same mask layer that creates the zero throat level. Therefore, during lapping, each switch resistance transition provides a location where a distance from the lapped surface to the zero throat level is known. The below-described process uses this fact to continuously calibrate S/J for the leveling resistors during lapping. This calibration is incorporated in the stripe height calculation to make stripe height equal throat height.

Refer now to FIGS. 1, 7A, 7B, and 8 for understanding of the operation of the lapping system illustrated in FIG. 6. FIGS. 1, 7A–8B schematically illustrate the two switch and leveling resistor configurations discussed above, while FIG. 8 is a flow diagram illustrating the sequence steps entailed in calibration and operation of the lapping system.

Initially, it is noted that lapping depth is determined by monitoring the resistances of the leveling resistors. Generally, the resistance of a leveling resistor is given by:

$$R = \frac{K}{SH + S/J} + RL \quad (1)$$

where:
K=Sheet resistance
SH=Stripe Height
S/J=Strap to function distance
RL=Lead Resistance.

Solving equation (1) for the stripe height gives:

$$SH = \frac{K}{R - RL} - S/J \quad (2)$$

Now, if K, RL, and S/J are known, the stripe height, and thus the depth of lapping can be tracked by tracking R. It is the purpose of the switches and the initial values of the leveling resistors to calculate these constants accurately.

The inventors have realized that the bypass resistor in the short leveling resistors provide a fast and very accurate means of determining lead resistances. Relatedly, before individuation of the slider rows by slicing of a wafer, the resistances of all ELG devices in every wafer row are measured, and the values are stored as a set of N 1×24 vectors, where N is the number of slider rows in a wafer. When the slider rows are individuated by slicing the wafer row-wise, each row is sliced along a line which severs the bypass resistors from the short levelers. For each individual slider row, following separation of the slider row the 1×24 resistance measurements are made again. Now, based on the initial wafer measurements of level resistances, the resistance of a long leveler is given by:

$$RW_L = \frac{K}{L_L + w} + RL \quad (3)$$

where:
K=Sheet resistance
$L_L$=Nominal Long Stripe Height
w=windage factor in microns added to $L_L$
RL=Lead Resistance.

For a short leveler at wafer measurement, before the bypass resistor is sliced off, the resistance is given by:

$$RW_S = \frac{\left(\frac{K}{S_S + w}\right) \times RBy}{\left(\frac{K}{S_S + w}\right) + RBy} \quad (4)$$

where:
$S_S$=Nominal Short Stripe Height
w=Windage in microns added to $S_S$
RBy=Bypass Resistance.

Now, when the bypass resistor is removed, the resistance for the short leveler is determined in the same manner as the resistance for the long leveler. Therefore, the initial resistance value measured just before lapping commences, after the bypass resistor has been removed, is given by:

$$RB_S = \frac{K}{S_S + w} + RL \quad (5)$$

Now, there are three known values ($RW_L$, $RW_S$, and $RB_S$) and four unknown terms (K, w, RBy, and RL). To resolve these equations, one unknown term must be assumed. The bypass resistance RBy is by design a very small value, less than 1 Ohm. Thus, equations (3), (4) and (5) can be resolved for RL and K. Replacing the factor K/($S_S$+w) in equation (2) by ($RB_S$–RL) from equation (3), the following quadratic equation is obtained for RL:

$$RL^2 - RL \times (RB_S + RW_S) + (RW_S \times RB_S) - RBy \times (RB_S - RW_S) = 0 \quad (6)$$

Equation (6) has two roots. Discarding the non-relevant root, RL is given by:

$$RL = \frac{RB_S + RW_S}{2} - \sqrt{\left(\frac{RB_S - RW_S}{2}\right)^2 + RBy \times (RB_S - RW_S)} \quad (7)$$

All six RL values obtained for a row are averaged to provide a single value of RL which is applied to all twelve level resistors before lapping proceeds.

Assuming now that two adjacent level resistance sites have values for K that are close enough to be considered equal, equations (1) and (3) are combined to eliminate w and resolve K by:

$$K = \frac{(L_L - S_S) \times (RB_S - RL) \times (RW_L - RL)}{(RB_S - RW_L)} \quad (8)$$

Referring to the slider row 100 in FIG. 6, K is initially calibrated along the row by pairing each level resistor twice: first with its left level resistor neighbor and next with its right level resistor neighbor. The two values of K obtained are then averaged to calculate a final K for that level resistor. This is done for all level resistors having two neighboring level resistors. For level resistors having only one neighboring level resistor, the K value obtained from that pair is the one used for that level resistor. If the level resistor has no valid neighbor, the K for that device is calculated through a linear fitting of the entire set of valid K valued for that row. Now, a default value of S/J is set until initial S/J calibration as described below. With this default value, the general stripe height formula given by equation (2) can be used.

Figure 7A:
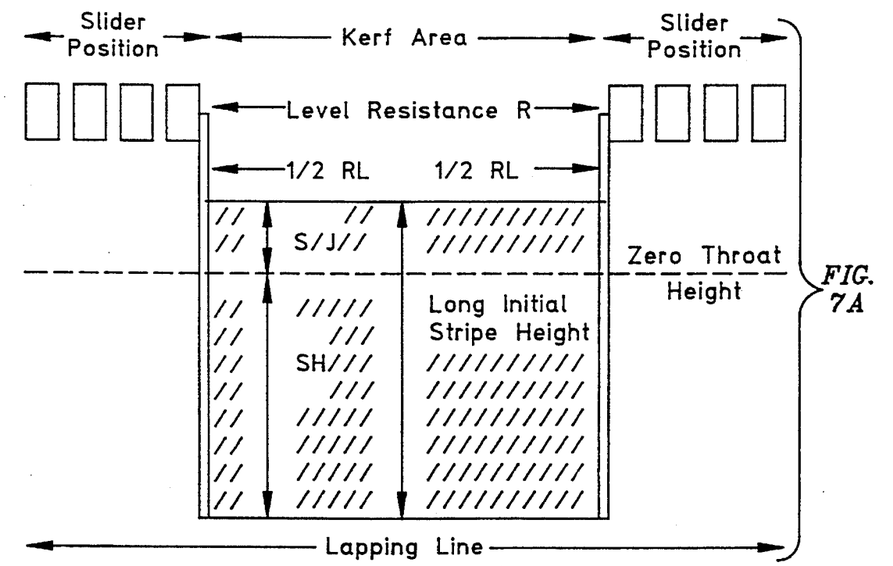
FIGS. 7A and 7B are schematic diagrams of the switching elements and leveling resistors employed in the invention.
Figure 7B:
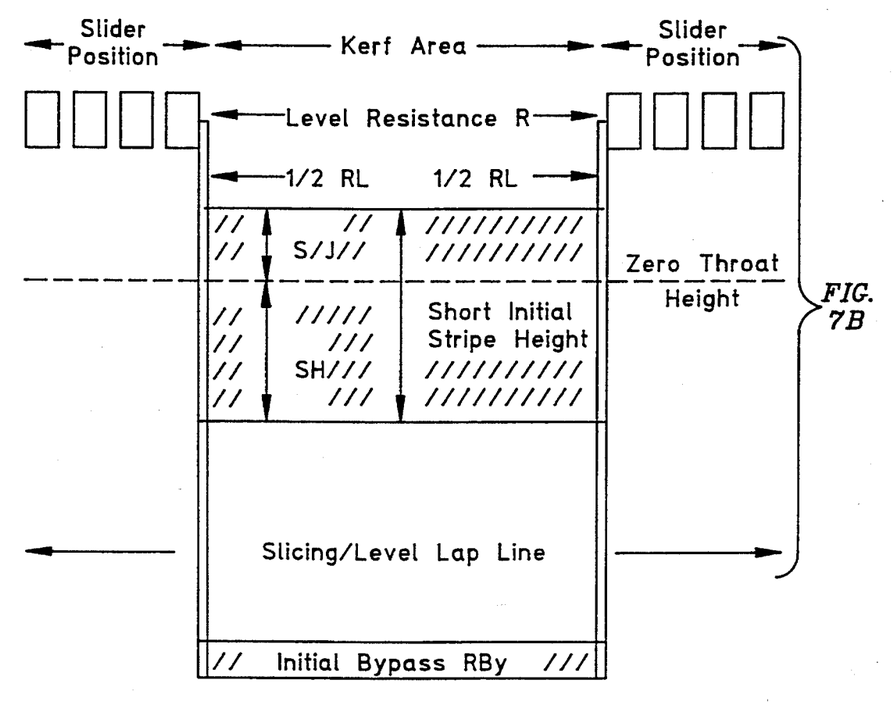

With these considerations. refer now to FIGS. 1, 7A and 7B, where FIG. 1 illustrates switch configurations S1 and S2. In switch S1, the first shunt is positioned at the first switching level (FL in FIG. 1). The shunt is hereinafter denoted as "FS". The second shunt of switch S1 is positioned at the upper throat target level (UL in FIG. 1). This shunt is denoted as "US". Switch S2 has a first shunt at an early calibration level; this shunt is denoted as "CS". The second shunt of switch S2 is denoted also as "US".

The level resistances in FIGS. 7A and 7B have the structures disclosed and discussed above with reference to FIGS. 4–5. Each level resistor includes a simple stripe resistor having a height referred as to "stripe height". Each long level resistor, preferably has a stripe height denoted as "$SH_L$", while the stripe of the resistor in the short leveler after deletion of the bypass resistor is denoted as "$SH_S$". The combinations of leveling resistors and the groups permit an initial calibration of sheet resistance "K" and width resistance "RL" as discussed above.

Leveling resistors are used for differential height measurements where the height of each resistor is used to track throat height, measured from the zero throat height. As explained above in connection with equation (2), the resistance measurement must be corrected by the strap-to-junction distance (S/J) which is the distance separating the lower edge of the leveling resistor stripe from zero throat height. This is shown for each leveling resistor in FIGS. 8A and 8B.

Figure 8:
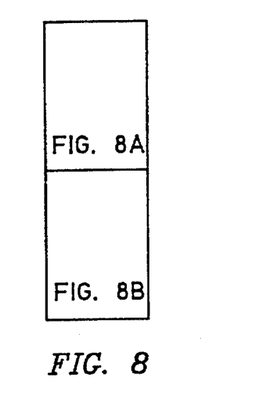
FIG. 8 is a flow diagram illustrating operation of the lapping system of FIG. 6.
Figure 8A:
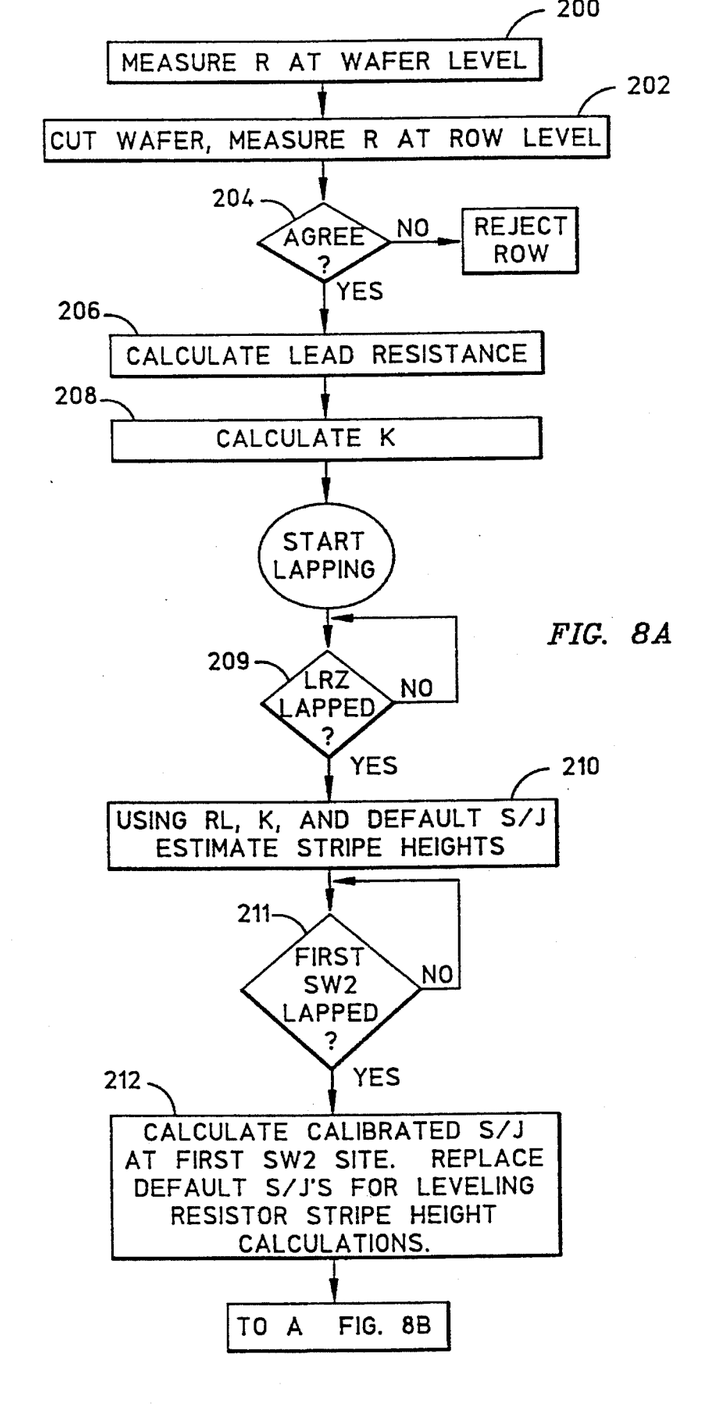
Figure 8B:
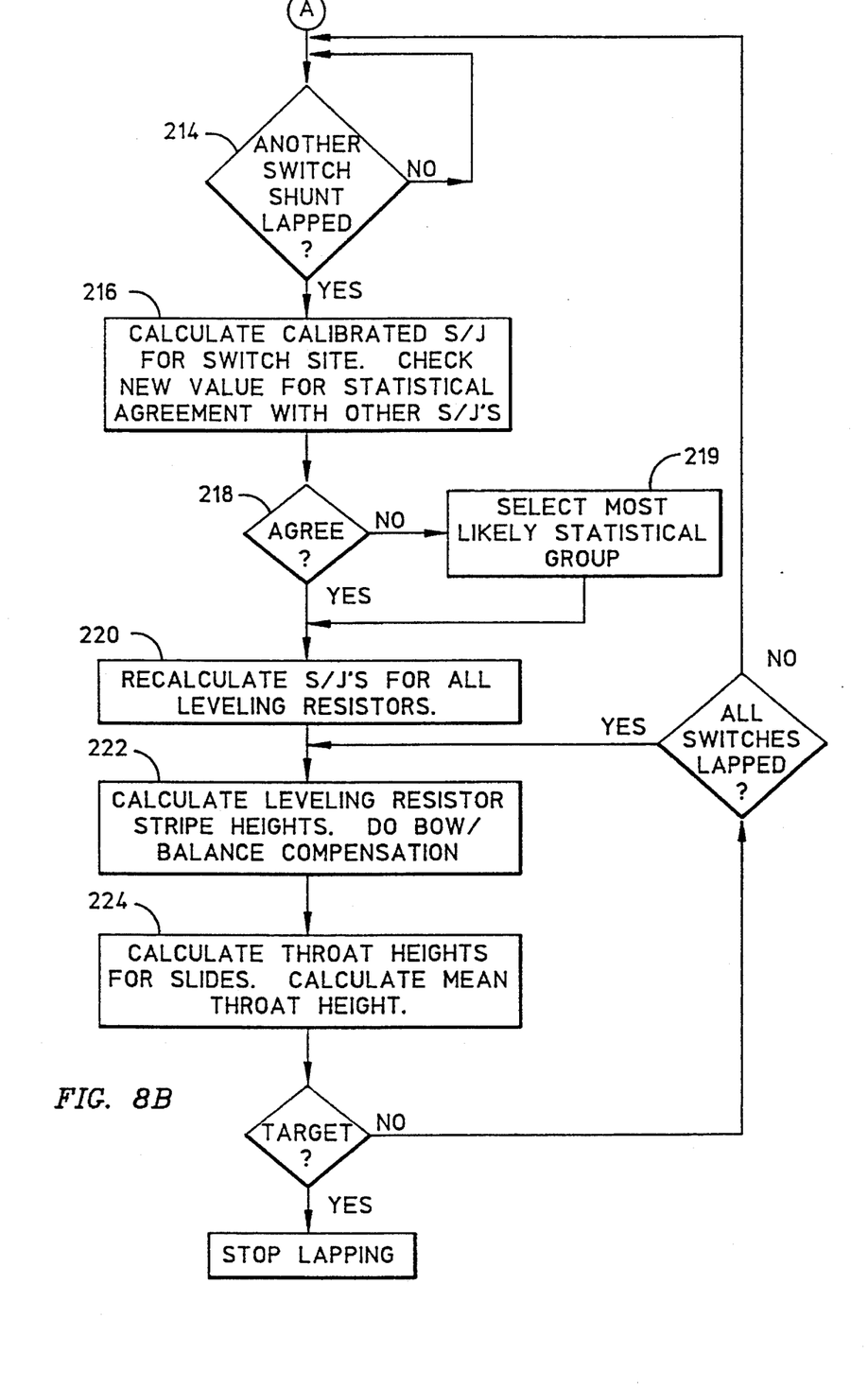

Refer now to FIG. 8 for an understanding of the operation of the lapping system of FIG. 6. Initially, the row measurements for lapping resistor resistances are obtained as discussed above in connection with equation (3) and (4). Next, the slider rows are cut from the wafer, cutting the bypass resistors in the short levelers. Now in step 202, the resistance measurements of equations (3) and (5) are made. If the values measured in step 202 deviate significantly from those measured in step 200, the negative exit is taken from decision 204 and the entire slider row is rejected. Otherwise, in step 206, equation (7) is solved using the resistance measurements made in steps 200 and 202 and, in step 208, equation (8) is solved for sheet resistance K. This completes the initial calibration, and lapping begins. The resistances of the long levelers are monitored in step 209 until first of the long levelers is lapped into, indicated by a change in its resistance. Next, in step 210, a default value for S/J is used to solve equation (2) for each long leveler. At this time, the lapping system begins tracking throat height by tracking stripe height (SH) at each of the long leveler locations by plugging the current value of the measured resistance R into equation (2). Upon lapping into the first shunt of an S2 switch, the stripe height of the switch is known. This stripe height is used to apply correction to the stripe height of the leveling resistors by inferring the stripe height at the switch S2 site to equal the known distance of the first shunt "CS". This, in turn, allows calibration of S/J for that site. S/J calibration is further refined as the early calibration shunt of each S2 switch is lapped into. It is assumed that S/J varies linearly along the slider row and thus is projected at each level resistor by linearly mapping the twelve S/J values for those devices onto a linear fitting of all S2 switches whose early calibration shunts have been lapped into. Accordingly, the controller calculates and retains S/J values for the six S2 switches.

S/J calibration is performed by the controller at step 212 by a program logic sequence that is keyed by lapping into the early calibration level of an S2 switch. As soon as the early calibration level is reached for a first S2 switch, a running average of the resistance of the two level resistors on each side of the S2 switch is taken providing a total of four values, each referred as "Rcs" (referring to calibration shunt CS). Since another S2 switch may indicate lapping to the early calibration level, storing the four Rcs values may happen in tiers. When early calibration is reached for an S2 switch, the stripe heights of the four adjacent level resistors (two on each side of the switch) are calculated, and a quadratic projection of these four heights is made from which a stripe height at the S2 switch site is made. Comparing the stripe height thus calculated to the known height of the switch "CS" gives a correction denoted as "c". The correction is calculated as:

$$c = SHcalc - CS \quad (9)$$

Next, a linear fitting of the four S/J values with the four adjacent linear resistors used in the stripe height calculations is made from which an S/J is inferred at the S2 switch height. These values are combined for this specific S2 switch site to obtain a calibrated S/J value according to:

$$S/Jcalib = S/Jcalc + SHcalc - CS \quad (10)$$

where:

S/Jcalc=linear projection from the 4 "Level R" S/J
SHcalc=quadratic projection from the 4 "Level R" SH
CS=1st shunt reference point.

If this was the first S/Jcalib calculated, it is extended to all of the level resistor sites for further stripe height calculations. Otherwise, the positive exit from decision 214 is taken and the value calculated for S/Jcalib is fitted linearly with other S/J values calculated for the linear resistors and that linear projection is used to adjust the S/J values at all level resistors for ongoing stripe calculations. If any of the four level resistors adjacent to an S2 is missing, or not available, the same calculations are made with fewer points.

From the logic executed for step 212, it will be appreciated that it is only after breaking through the first early calibration shunt that stripe heights can be reliably calculated. Until then, the algorithm employed by the controller 134 uses stripe height calculations only for bow and balance compensation, but not for target throat height recognition.

Assume now that the shunt of another switch has been lapped into. The positive exit is taken from decision 214 and the logic of step 216 is executed. In step 216, the correction logic to calibrate S/J is repeated and shunt height calculations are made for that site. The logic is essentially identical with the logic of step 212, except that the particular shunt height of the switch resistor which has been lapped into is used in equation (10). Once the calibrated S/J value is calculated for the lapped switch, it is checked to make sure it is in statistical agreement with the calibrated (S/J) values for other switch sites. Recall that S/J calibration is based on the assumption that these values are physically determined by linear processes and result in a near linear distribution of S/J values along a row. In fact, the inventors' experimental results validate this assumption and show that ninety-two percent of the individual S/J calibration points follow a linear progression, with a mean distance to the fit line of 0.07 microns, and a "1Σ" variation of 0.05 microns on the mean. By comparison, the remaining eight percent of the points have a 0.5 micron mean distance to the fit line with a 0.35 micron "1Σ". These latter points are termed "maverick" points and may be the result of improper switch registration because of impurities in the manufacturing process. They may also be the result of noise in the resistance values used for calibration.

In any event, in order to prevent maverick points polluting the linear fit of the majority of the points, a fit test is applied in step 216 after a minimum of points have been obtained. Relatedly, as long as the number of S/J points is greater than or equal to a minimum number of linear fitting value, the controller determines the difference between the calibrated S/J point and its fitted value. The controller then compares the difference to an experimentally-determined deviation value. If the difference exceeds the deviation value, the point is considered maverick. In order to prevent a switching point at the end of a slider row pulling the fit line enough to cause a rejection of an otherwise good point, the algorithm retries the fit test twice more anytime there is a fit reject, once without the left-most point, and once without the right-most point. Of these three points, the one whose distance from the fit is largest is rejected. Rejected S/J points are merely held for the site and are retested with any inclusion of a new calibration point. This provision ensures, to the very end, that all valid points contribute to the determination of S/J.

Therefore, assuming that the newly calculated S/J value is in statistical agreement with the linear fit line from other calibrated switch sites, the positive exit is taken from decision 218, and the S/J values of all the level resistors are recalculated based on a linear fit projection from the known and statistically acceptable calibrated S/J values at the switch sites. This occurs in step 220 and the recalibrated S/J values are employed in the on-going stripe height calculations based on current measurements of R at each leveling resistor site. The stripe heights for the leveling resistors are used for bow and balance compensation calculations that are used conventionally by the controller 134 to operate the actuators 112, 114 and 116.

In step 224, the current throat heights of all slider head elements are calculated, with the throat height of any particular head element being based on quadratic projection of the stripe heights of the three closest level resistors. The algorithm calculates a mean throat height for the entire slider row, tests it against the target throat height in decision 226, and continues according to whether or not the target throat height had been reached.

The inventors contemplate that calibration of S/J can continue up to and beyond the target throat height by setting switch levels at the target and lower level values. However, the inventors' experience has shown that, as the target throat height is approached, bow and balance compensation are more effectively and efficiently performed when not interrupted for S/J recalibration. Consequently, in the best mode of this invention, S/J recalibration ceases after the last switch site is lapped to the upper target throat height level (UL in FIG. 1).

While we have illustrated and described our invention by means of specific embodiment, it is to be understood that numerous changes and modifications may be made therein without departing from the spirit and scope of the invention as defined in the appended claims.

We claim:

1. A lapping control process for accurately providing a desired throat height of each of a plurality of batch fabricated thin film magnetic transducers, said system comprising:

forming a row of thin film transducers on a substrate, said row comprising a height defining edge and at least four spaced sensing devices, a first two of said sensing devices comprising switch devices, each switch device offset a predetermined amount from said height defining edge, and a second two of said sensing devices comprising resistive devices, each resistive device offset a predetermined amount from said height defining edge;

forming a plurality of parting kerfs in said row of thin film transducers each parting kerf of said plurality of parting kerfs being located in said row between adjacent transducers, said switching devices and said resistance devices each being separately confined substantially to an area of a parting kerf;

mounting said row of thin film magnetic transducers in a position to lap said height defining edge of each of said thin film magnetic transducers and said sensing devices;

measuring the resistance of said resistive devices during lapping of said height defining edge;

calibrating resistance versus throat height characteristics for each of said thin film magnetic transducers in said row in response to said measured resistance and to a selected state of at least one of said switch devices; and terminating said lapping process when a predetermined throat height is reached for each of said thin film magnetic transducers.

2. A lapping process according to claim 1 wherein said step of forming said switching devices and said resistance devices comprises separately confining each substantially to the area of a parting kerf between adjacent transducers.

3. A lapping process according to claim 2 wherein said step of forming said switching devices includes forming said devices offset from said height defining edge a different amount.

4. A lapping control process according to claim 3 wherein said step of forming said switching devices includes forming said devices as shunt devices, and forming one shunt of one of said switches set to a first limit and the other shunt of said one switch set to an upper limit, and forming one shunt of the other said switches set to early calibration limit and forming the other of said shunts set to the upper limit.

5. A lapping control process according to claim 3 wherein one of said resistance devices has a long resistance stripe and the other of said resistance devices has a short resistance stripe and a bypass resistance.

6. An apparatus for supporting magnetic transducers for batch fabrication, comprising:

a wafer of substrate material;

a row of thin film transducers formed in said substrate material, said row comprising a height defining edge of said wafer;

at least four spaced sensing devices formed in said substrate material, a first two of said sensing devices comprising switch devices, each switch device offset a predetermined amount from said height defining edge, and a second two of said sensing devices comprising resistive devices, each resistive device offset a predetermined amount from said height defining edge; and a plurality of parting kerfs in said row of thin film transducers, each parting kerf of said plurality of parting kerfs being located in said row between adjacent transducers, said switching devices and said resistive devices each being separately confined substantially to an area of a respective parting kerf.

7. The apparatus of claim 6, a first resistive device of said resistive devices including a leveling resistor with a long resistive stripe and second resistive device of said resistive devices including a leveling resistor having a short resistive stripe.

8. The apparatus of claim 6, wherein each switch device of said switch devices includes a two-position switch.

9. The apparatus of claim 8, wherein each switch of said switches includes a first switching plane positioned at a predetermined location with respect to said height defining edge, a first switch of said switches includes a second switching plane positioned at a predetermined first height limit distance from said height defining edge, and a second switch of said switches includes a third switching plane at an early calibration location located at a predetermined distance from the height defining edge.

10. A lapping control process for accurately providing a desired throat height of each of a plurality of batch fabricated thin film magnetic transducers, said system comprising:

forming a row of thin film transducers on a substrate, said row comprising a height defining edge and at least four spaced sensing devices, a first two of said sensing devices comprising switch devices each offset a predetermined amount from said height defining edge, and a second two of said sensing devices comprising resistive devices each offset a predetermined amount from said height defining edge;

mounting said row of thin film magnetic transducers in a position to lap said height defining edge of each of said thin film magnetic transducers and said sensing devices;

measuring the resistance of said resistive devices during lapping of said height defining edge;

calibrating resistance versus throat height characteristics for each of said thin film magnetic transducers in said row in response to said measured resistance and to a selected state of at least one of said two switch devices; and terminating said lapping process when a predetermined throat height is reached for each of said thin film magnetic transducers; where said step of forming said switching devices and said resistance devices comprises separately confining each substantially to the area of a parting kerf between adjacent transducers.

11. A lapping process according to claim 10 wherein said step of forming said switching devices includes forming said devices offset from said height defining edge a different amount.

12. A lapping control process according to claim 11 wherein said step of forming said switching devices includes forming said devices as shunt devices, and forming one shunt of one of said switches set to a first limit and the other shunt of said one switch set to an upper limit, and forming one shunt of the other said switches set to early calibration limit and forming the other of said shunts set to the upper limit.

13. A lapping control process according to claim 11 wherein one of said resistance devices has a long resistance stripe and the other of said resistance devices has a short resistance stripe and a bypass resistance.

* * * * *

UNITED STATES PATENT AND TRADEMARK OFFICE
CERTIFICATE OF CORRECTION

PATENT NO. : 5,597,340
DATED : January 28, 1997
INVENTOR(S) : Church et al

It is certified that error appears in the above-indentified patent and that said Letters Patent is hereby corrected as shown below:

```
Column 13, line 35, change "system" to --process--;
          line 66, insert --control-- between "lapping" and
             "process"

Column 14, line 56, change "system" to --process--
```

Signed and Sealed this

Twenty-eighth Day of October, 1997

Attest:

BRUCE LEHMAN

Attesting Officer

Commissioner of Patents and Trademarks